United States Patent Office 3,776,977
Patented Dec. 4, 1973

3,776,977
METHOD OF CURING ORGANIC SILOXANE
POLYMERS AND COPOLYMERS
Rajendra Nath Chadha, Farmingdale, N.Y., assignor to
Stauffer Chemical Company, Adrian, Mich.
No Drawing. Continuation-in-part of application Ser. No.
37,409, May 11, 1970, which is a continuation of application Ser. No. 516,689, Dec. 27, 1965, both now abandoned. This application June 18, 1971, Ser. No. 154,594
Int. Cl. C08g 47/10, 45/16
U.S. Cl. 260—825
10 Claims

ABSTRACT OF THE DISCLOSURE

A curable composition is disclosed which comprises a hydroxylated organopolysiloxane fluid and an organic polymer having one or more silyl groups connected thereto. Each silyl group contains one or more groups capable of reacting with the hydroxyl groups of the organopolysiloxane.

This application is a continuation-in-part of my copending application, Ser. No. 37,409 filed May 11, 1970 now abondoned, which in turn was a continuation of application Ser. No. 516,689, filed Dec. 27, 1965, and now abandoned.

This invention relates to a novel method for effecting the curing or vulcanization of organic polymers and copolymers. More particularly, the invention is concerned with a method which is adapted to achieve the curing without the aid of extraneous heat or pressure i.e. under ambient conditions.

It is well known, that certain materials having a liquid, gum, gel or paste-like character may be cured by various means to achieve highly useful products. Thus natural rubber, for instance, is cured or vulcanized by treatment with sulfur and other chemicals at elevated temperatures, the rubber being thereby converted from a gummy mass to the tack-free elastomer well known to everyone. Many other organic polymers including both those classified as elastomers and those classified as plastics are cured similarly.

The requirement of elevated temperatures in these curing processes as practiced on an industrial scale represents a vast expenditure. This energy requirement accounts for a substantial portion of the cost of the elastomer or plastic. In addition, the requirement of extraneous heat negates against the use of such plastics and elastomers in those cases where the curing must take place in situ in the presence of materials unadapted to withstand elevated temperatures.

As should be apparent from the foregoing, the invention has for its principal object the provision of a process for bringing about the curing of organic materials, particularly organic polymers and copolymers, at commonly experienced temperatures.

In accordance therewith, the stated object is accomplished through the incorporation in the organic material of one or more silyl groups, each of which contains one or more reactive groups, and a hydroxylated organopolysiloxane fluid.

The silyl groups may be represented by the formula

in which R is a hydrocarbon radical or a halogenated hydrocarbon radical, X is a reactive radical, and z is a number from 1 to 3. The reactive radicals are capable of reacting with the hydroxyl groups of the organopolysiloxane to form small molecules of the formula HX, and a linkage of the type Si—O—Si, whereby the organic polymer becomes bonded to the oragnopolysiloxane.

Radicals represented by X, above include hydrogen, hydroxyl, alkoxy, aryloxy, halogen, acyloxy, phosphato, amino, amido, aminooxy and oximo. Of those that react spontaneously, the preferred radicals are acyloxy, e.g., acetoxy and propionoxy; amino, e.g., butylamino, cyclohexylamino, dimethylamino, and morpholino; oximo, e.g., acetoximo; and aminooxy, e.g., diethylaminooxy. Reactive radicals that require a catalyst are preferably hydrogen or an alkoxy radical, e.g., methoxy, ethoxy, propoxy, isopropoxy, and 2-methoxyethoxy.

The reactive radicals may react spontaneously with the hydroxyl groups, in which case, curing takes place rapidly at room temperature. Alternatively, a catalyst may be required, in which case the composition is stable for long periods, and curing is effected only after the catalyst is added.

It is not necessary, that a large proportion of silyl groups be present. For minimum curing the total number of reactive groups should be at least three per molecule. This can be achieved by one silyl group of the type—SiX₃, two of the type

or three of the type

Somewhat more than the minimum is generally preferred, depending on the degree of cross linking required. The total amount of silicon in the organic polymer may thus range from as little as 1 percent or less to as high as 20 percent, when a highly crosslinked product is desired.

The silyl group may be incorporated by means of a silane in which the valence bond of the silicon shown as unsatisfied may be satisfied by hydrocarbon radicals, such as, alkyl, aryl, alkaryl, aryalkyl, and cycloalkyl radicals. Alternatively, such unsatisfied valence bond may provide a link to an unsaturated hydrocarbon group, to an oxygen atom of an organopolysiloxane chain or ring or to another silicon atom, as in disilanes, trisilanes, etc. In these polysilanes, a plurality of the silicon atoms may have OH radicals or OH-convertible radicals attached thereto.

Among the many silyl compounds having application to the invention may be mentioned:

trichlorosilane,
tetrachlorosilane,
methyltrichlorosilane,
methyldichlorosilane,
3-methylbutadienylmethyldimethoxysilane,
dichlorodiethoxysilane,
dibromodipropoxysilane,
vinyltriacetoxysilane,
dichlorodipropionoxysilane,
methyltrimethoxysilane,
vinyltriethoxysilane,
allyltrimethoxysilane,
phenyltriacetoxysilane,
methacrylatopropylsilane,
butadienyltriacetoxysilane,
butadienyltriethoxysilane,
isopropyltriacetoxysilane,
phenyltriacetoxysilane,
propyltripropionoxysilane,
ethyltriacetoxysilane,
cyclohexyltripropoxysilane,
heptyltriisopropionoxysilane,
silanediols and disiloxanediols e.g.,
dimethylsilanediol,
diphenylsilanediol,
tetramethyldisiloxanediol, etc.

The method herein is virtually unlimited as to the organic polymer or copolymer to which it is applied. However, as a matter of providing examples, polymers and copolymers based on the following organic monomers may be mentioned: unsaturated aliphatic hydrocarbons, such as ethylene, propylene, butylene, isoprene, butadiene; halogenated aliphatic hydrocarbons, such as vinyl chloride, vinylidene chloride, chlorobutadienes; alpha-methyl styrene, methyl acrylate, styrene, 2,5-dichlorostyrene, methacrylonitrile and methyl methacrylate.

Hydrocarbon-substituted homologues of any of the foregoing monomers, of course, are also applicable. Similarly, the many vinyl and diene monomers having a hydrocarbon backbone find utility in the practice of the invention.

The introduction of the functional silyl group or groups into the selected organo-polymer may be effected incident to the preparation of the polymer or the polymer may be pre-prepared and the silyl group or groups subsequently introduced thereinto. Of the various specific ways whereby the silylization may be achieved, the following may be cited for illustration:

(1) An unsaturated silane may be copolymerized with vinyl-type organic monomers by known means. Suitable unsaturated silanes adapted for this purpose include vinyltrialkoxysilane, methylvinyldialkoxysilane, vinyltriacetoxysilane, allylsilanes, butadienylsilanes, isoprenylsilanes and silanes in which the double bond is as remote from the silicon atom as in methacrylatopropylsilanes:

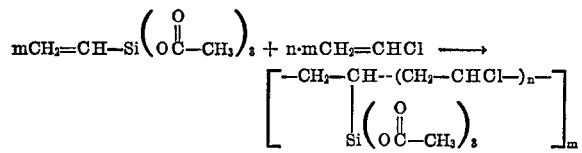

(2) A preformed organic polymer may be added to or condensed with silanes by means of suitable functional groups. Examples include the following:
 (a) Addition of epoxyalkylsilanes to reactive groups in the organic polymer:

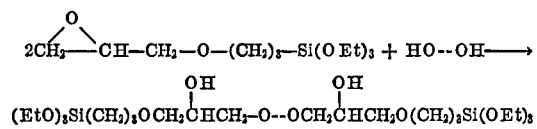

(b) Addition of hydroxyalkylsilanes to cyclic anhydride groups in the organic polymers:

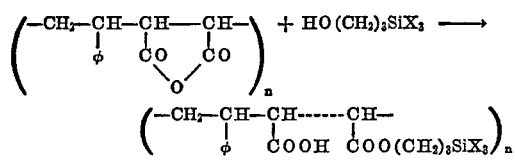

(c) Condensation of hydroxyalkylsilanes with acid chloride groups in the organic polymer:

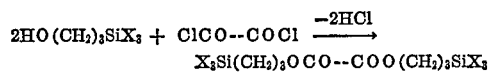

(3) An unsaturated silane may be reacted with an organic polymer in the presence of free radicals:

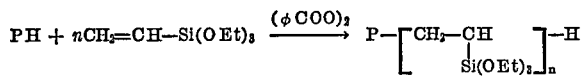

PH=any polymer susceptible to grafting e.g., polyethylene, polyvinyl chloride, polyvinyl acetate, polypropylene, polymethyl methacrylate, polystyrene, etc.

Examples of suitable silanes are epoxyalkyl silanes such as

γ-glycidoxypropyltriethoxysilane,
γ-glycidoxypropyltripropoxysilane,
γ-glycidoxypropyltrimethoxysilane,
γ-glycidoxyhexyltributoxysilane,
4,5-epoxypentatriethoxysilane,
5,6-epoxyhexyltributoxysilane, etc.; hydroxyalkylsilanes such as hydroxyethyltrimethoxysilane,
hydroxypropyltrimethoxysilane,
hydroxyhexyltributoxysilane and the like.

Organic compounds which may be reacted with the hydroxyalkylsilanes are cyclic anhydrides such as, phthalic anhydrides, maleic anhydride, and acid chlorides such as succinyl chloride, dodecanedioyl chloride, phthaloyl chloride and the like.

Examples of suitable hydroxyl terminated hydrocarbons which may be reacted with the epoxyalkylsilanes are ethylene glycol, 1,4-butylene glycol, 1,6-hexamethylene glycol and the like.

The reaction between the organic polymer and the silyl radical will proceed over a wide temperature range, i.e., at a temperature of from about 0° C. to about 200° C. and more preferably from about 40° C. to about 150° C.

Although the organopolysiloxanes are normally linear polysiloxane fluids having terminal hydroxyl groups, a low degree of branching is permissible and a small number of pendant hydroxyl groups may be present. In any case, the total number of hydroxyl groups should not exceed four per molecule. Two hydroxyl groups per molecule is the preferred number.

The organic groups of the organopolysiloxane may be any monovalent hydrocarbon, halogenated monovalent hydrocarbon or cyanoalkyl groups. Examples of suitable alkyl groups are methyl, ethyl, propyl, and butyl; alkenyl groups such as vinyl and allyl, aryl groups such as phenyl and tolyl; halogenated alkyl and aryl groups such as trifluoropropyl, chlorophenyl, and dichlorophenyl and cyanoalkyl groups such as cyanopropyl and the like. Methyl and phenyl groups are highly suitable. In general, at least 50 percent of the groups should be methyl.

Generally speaking, a satisfactory degree of cure is obtained by the reaction of the silylized organic polymer and the hydroxylated organopolysiloxane. If further cure is desired, it may be achieved by allowing unreacted X groups to react with atmospheric moisture. In this reaction, two molecules of HX are formed and a new

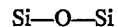

crosslink is formed. For this reaction, it is necessary that the total number of X groups in the organic polymer exceed the total number of OH groups in the polysiloxane. In any case, the primary crosslinking takes place by reaction with the polysiloxane.

In the practice of the invention it is preferred to employ only so much of the silyl compound as is required to achieve the desired degree of chain-lengthening and/or cross-linking, this being set by the properties required in the finished product. A highly cross-linked product may require as much as 20 percent elemental silicon based on the weight of the hybrid polymeric material. On the other hand, in some cases as little as 1 percent or less elemental silicon in the product polymer may answer to specifications.

Although the reaction between the silylized organic polymer and the hydroxylated organopolysiloxane may occur at room temperature, the reaction may be accelerated by heating the reactants to a temperature of from about 30° C. to about 150° C., more preferably from about 30° C. to about 70° C.

Certain of the reactions herein leading to the silyl-containing polymers require a catalyst while others proceed satisfactorily without the aid of a catalyst. In any case, the water required for the hydrolysis and cross-linking of the polymer is normally derived ambiently. The equation below is supplied to illustrate the hydrolysis and cross-linking. In the particular case an organotin catalyst is employed to promote the hydrolysis:

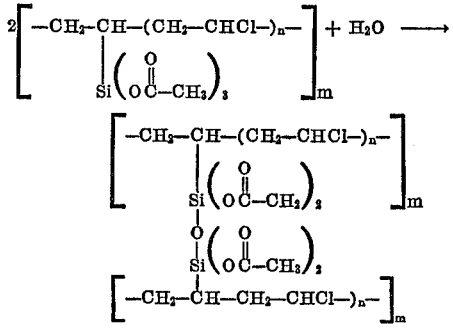

Further cross-linking, it will be understood, results from hydrolysis of the remaining acyloxy groups.

Other catalysts which may be employed are metal salts of carboxylic acids such as lead, tin, zirconium, iron, cadmium, titanium, calcium and manganese salts of carboxylic acids. It is preferred, that the carboxylic acid radical contain less than 14 carbon atoms and more preferably from about 2 to 10 carbon atoms. Examples of suitable salts are metal naphthenates, propenates, butyrates, laurates, such as, dibutyltin dilaurate and the like. Other organometallic compounds are dibutyltin butoxy chloride, bis-(acetoxydibutyltin)oxide, benzylbutylphenyltin hydroxide, di-t-butylchlorotin hydroxide and the like.

The catalysts are effective in minimal amounts, e.g., from about 0.02 to about 2 percent, preferably from about 0.1 to about 1 percent, by weight based on the weight of the composition.

The compositions herein described have many applications, such as, sealants, as insulation material for electrical components, gasket materials, and shock absorbers.

The invention is further illustrated by the following examples which are not to be taken as in any way limitative thereof.

EXAMPLE 1

To a dry nitrogen-purged, 3-neck, 500-ml., round-bottom flask equipped with a thermometer, stirrer, gas inlet and condenser were added 98 grams of styrene, 2 grams of 3-methylbutadienylmethyldimethoxysilane and 3 grams of lauroylperoxide. The whole was heated to 70° C. and maintained at such temperature for approximately 2½ hours. At this time, the viscosity had increased to a molasses consistency. Five grams of $CBr_4$ were added to terminate the reaction, whereafter the residual monomers were stripped at reduced pressure. Results: 84 grams of a high-viscosity product—Si anal.: 0.36%.

A portion of the product was dissolved in acetone and precipitated with methanol to remove the low molecular weight polymers. Result: A solid product—Si anal.: 0.51%.

The stripped product and hydroxylated organopolysiloxane fluid (2300 cp.) were mixed in 1:1 weight ratio, catalyzed with stannous octoate, and allowed to cure. Result: A white opaque rubbery product.

EXAMPLE 2

To a flask as described in Example 1 were added 98 grams of styrene, 2 grams of 3-methylbutadienylmethyldiacetoxysilane and 3 grams of azobisisobutyronitrile. The whole was heated to 70° C. and maintained at such temperature for approximately 2½ hours. This increased the viscosity of the mixture significantly. At this stage, 1 ml. of silicon tetrabromide was added to terminate the reaction. The residual monomers were then stripped at reduced pressure. Result: 76.5 grams of a yellow-tan, high-viscosity (Gardner Y-Z viscosity) product.

A portion of the product was cast on a glass plate and allowed to cure in air. Result: A fairly flexible, tough film.

A second portion of the product was mixed in 1:1 weight ratio with hydroxylated organopolysiloxane fluid (2,600 cp.), cast on a glass plate and allowed to air-cure. Result: A white opaque rubber material.

EXAMPLE 3

Low molecular weight polyisoprene with "living" ends was prepared using an initiator made up of the following materials:

|  | Gm. |
|---|---|
| Naphthalene | 10 |
| Tetrahydrofuran (anhydrous) | 35 |
| Sodium (excess) | 3 |

The initiator components were stirred under nitrogen at room temperature overnight, whereafter the resulting dark green solution was decanted from the excess sodium and stored under nitrogen.

The polymerization of the isoprene was carried out in dry nitrogen-flushed ampoules at 0° C. In each case, 10 ml. of isoprene was added dropwise to 2 mol. of the initiator solution diluted with 28 ml. of the anhydrous THF. The resulting solutions became viscous and turned pink to red in color.

An increment of dichlorodiethoxysilane was added to the polymer solution, resulting in a viscosity increase and discharge of the pink color. The excess of silane was removed by vacuum distillation. When samples of this material were mixed with organopolysiloxane hydroxy fluid (2300 cp.) and stannous octoate a cured rubber of desirable properties resulted.

EXAMPLE 4

In this experiment the following materials in the quantities indicated were utilized:

| | |
|---|---|
| Carboxy-terminated polybutadiene (M.W. 5000) gm | 100.0 |
| Glycidoxypropyltrimethoxysilane gm | 9.4 |
| N,N-dimethylaniline ml | 0.5 |

The reaction was carried out at 130° C. under nitrogen in a 250-ml. flask provided with a mechanical agitator. It was terminated after 16 hours by removing unreacted silane under vacuum (0.1 mm. Hg) at 130° C. The product was a clear amber gum.

A portion of the product dissolved in toluene was mixed with 1500 cp. hydroxylated organopolysiloxane fluid. The mixture, catalyzed with stannous octoate cured to a soft rubber in approximately 15 minutes.

EXAMPLE 5

To a nitrogen-purged, 3-neck, 2000-ml. flask equipped with a condenser, thermometer, mechanical agitator and a gas inlet were added 500 grams of 1,2-polybutadiene, 300 ml. of dry toluene and 2.0 ml. of a 0.4 N solution of chloroplatinic acid in isopropyl alcohol. The temperature of the whole was increased to 40° C. after which 100 grams of methyldimethoxysilane were added dropwise. The temperature was then increased to 55° C. and maintained thereat for 16 hours. The product was precipitated with methanol, separated and dried at 50° C. under vacuum (25 in. Hg) for 24 hours. Result: Si anal.: 3.90%=91.2% theoretical yield.

A portion of the product was applied as follows:

| | Parts |
|---|---|
| Polymer (by weight) | 100 |
| Carbon black (continex F–3) | 40 |
| 2800 cp. hydroxylated organopolysiloxane fluid | 10 |
| Tin catalyst | 2 |

A sample specimen of the thoroughly mixed, filled product was pressed into a window mold and the sample allowed to cure at room temperature. A tough rubbery product resulted.

EXAMPLE 6

A polysiloxane was prepared from the following:

| | Gm. |
|---|---|
| Styrene | 104.00 |
| Vinyltriethoxysilane | 10.50 |
| Organopolysiloxane OH-fluid (1300 cps.) | 114.50 |
| Di-t-butylperoxide (catalyst) | 0.11 |

The polymerization was carried out at 125° C. under nitrogen in a 500-ml. flask equipped with a mechanical agitator. The reaction was stopped after 27 hours by vacuum distillation of unreacted monomers. The product was an opaque white fluid soluble in toluene. When a portion of this product was mixed with a catalytic amount of stannous octoate it cured to a strong resilient rubber.

The invention claimed is:

1. A curable composition comprising an organopolysiloxane fluid having terminal hydroxyl groups and an organic polymer, which is obtained from the reaction of an epoxyalkylsilane and an organic compound selected from the group consisting of glycols and polymeric glycols.

2. The composition of claim 1 wherein the organic compound is a glycol.

3. A curable composition comprising an organopolysiloxane fluid having terminal hydroxyl groups and an organic polymer, which is obtained from the reaction of a hydroxyalkylsilane and a polymer containing a cyclic anhydride.

4. A curable composition comprising an organopolysiloxane fluid having terminal hydroxyl groups and an organic polymer, which is obtained from the reaction of a hydroxyalkylsilane and a polymer containing an acid chloride group.

5. A curable composition comprising an organopolysiloxane fluid having terminal hydroxyl groups and an organic polymer, which is obtained by grafting a silane having an unsaturated hydrocarbon group to a preformed organic polymer in the presence of an organic peroxide catalyst.

6. A method for preparing the composition of claim 1 which comprises reacting a hydroxyl-terminated organopolysiloxane fluid with an organic polymer obtained from the reaction of an epoxyalkylsilane and an organic compound selected from the group consisting of glycols and polymeric glycols.

7. The method of claim 6 wherein the organic compound is a glycol.

8. A method for preparing the composition of claim 3 which comprises reacting a hydroxyl-terminated organopolysiloxane fluid with an organic polymer obtained from the reaction of a hydroxyalkylsilane and a polymer containing a cyclic anhydride.

9. A method for preparing the composition of claim 4 which comprises reacting a hydroxyl-terminated organopolysiloxane fluid with an organic polymer obtained from the reaction of a hydroxyalkylsilane and a polymer containing an acid chloride group.

10. A method for preparing the composition of claim 5 which comprises reacting a hydroxyl-terminated organopolysiloxane fluid with an organic polymer obtained by grafting a silane having an unsaturated hydrocarbon group to a preformed organic polymer in the presence of an organic peroxide catalyst.

References Cited

UNITED STATES PATENTS

| | | | |
|---|---|---|---|
| 3,300,542 | 1/1967 | Hadlock | 260—825 |
| 3,127,363 | 3/1964 | Nitzsche et al. | 260—825 |
| 3,440,205 | 4/1969 | Chadha et al. | 260—825 |
| 3,440,206 | 4/1969 | Pande et al. | 260—825 |
| 3,440,207 | 4/1969 | Nitzsche et al. | 260—825 |
| 3,441,534 | 4/1969 | Knaub | 260—825 |
| 3,655,598 | 4/1972 | Antonen et al. | 260—825 |

WILBERT J. BRIGGS, Sr., Primary Examiner

U.S. Cl. X.R.

260—46.5 G, 46.5 UA, 448.2 Q, 448.2 R, 824 EP, 827, 830 R, 836, 875, 878 R, 884, 885, 886, 887